(12) United States Patent
Maegawa et al.

(10) Patent No.: US 6,316,851 B1
(45) Date of Patent: Nov. 13, 2001

(54) MOTOR

(75) Inventors: Hiroaki Maegawa, Machida; Chikara Aoshima, Zami, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/455,412

(22) Filed: Dec. 6, 1999

(30) Foreign Application Priority Data

Dec. 7, 1998 (JP) .................................................. 10-363828

(51) Int. Cl.⁷ .................................................. H02K 37/00
(52) U.S. Cl. ........................ 310/49 R; 310/266; 310/257; 310/41
(58) Field of Search ................................ 310/49 R, 266, 310/254, 156, 261, 257, 67 R, 41

(56) References Cited

U.S. PATENT DOCUMENTS

| | | | |
|---|---|---|---|
| 4,004,165 | * 1/1977 | Haydon | 310/41 |
| 4,097,833 | * 6/1978 | Myers | 335/261 |
| 4,644,211 | * 2/1987 | Idogaki et al. | 310/266 |
| 4,928,028 | * 5/1990 | Leibovich | 310/23 |
| 5,384,506 | * 1/1995 | Aoshima | 310/49 R |
| 5,831,356 | 11/1998 | Aoshima | 310/49 R |
| 5,925,945 | 7/1999 | Aoshima | 310/49 R |
| 5,945,753 | 8/1999 | Maegawa et al. | 310/68 B |
| 5,969,453 | 10/1999 | Aoshima | 310/156 |
| 5,973,425 | 10/1999 | Aoshima | 310/49 R |
| 6,081,053 | 6/2000 | Maegawa et al. | 310/49 |

* cited by examiner

*Primary Examiner*—Burton S. Mullins
(74) *Attorney, Agent, or Firm*—Fitzpatrick, Cella, Harper & Scinto

(57) ABSTRACT

A single-phase motor which includes a rotor magnet alternately magnetized to different poles by dividing it along a circumferential direction and in which a coil is disposed in an axial direction of said rotor magnet. Outer magnetized portions of an outer yoke magnetized by the coil and inner magnetized portions of an inner yoke magnetized by the coil are opposed to outer and inner peripheral surfaces of the rotor, respectively. There is also provided a holder for holding the rotor magnet at a position where centers of magnetic poles of the magnet are deviated from a straight line connecting centers of the outer magnetized portions and a rotational center of the magnet when the outer and inner magnetized portions are not magnetized. The inner yoke has a small diameter portion, and, only by reducing the diameter of the small diameter portion, the space within which the coil is wound can be widened so that the coil can be wound around the small diameter portion greatly, thereby providing a single-phase motor having high output.

9 Claims, 9 Drawing Sheets

US 6,316,851 B1

MOTOR

BACKGROUND OF THE INVENTION

1. Field of the Invention

The present invention relates to a super-compact motor.

2. Related Background Art

Among compact motors, there is a compact cylindrical stepping motor as shown in FIG. 15.

In FIG. 15, a motor as shown includes two stators 102 arranged in an axial direction, and each stator has two stator yokes 106 opposed to each other in the axial direction. For each stator 102, a stator coil 105 is coaxially wound around a bobbin 101 held by two stator yokes 106. Each bobbin 101 on which the stator coil 105 is wound is pinched between and secured by two stator yokes 106 from the axial direction. Each stator yoke 106 is provided with stator teeth 106a, 106b arranged alternately. On the other hand, a pair of stator yokes 106 having stator teeth 106a, 106b are secured to a case 103 of each stator 102. In this way, the stators 102 are constructed.

A flange 115 and a bearing 108 are secured to one (left one) of two cases 103, and an opposite bearing 108 is secured to the other case 103. A rotor 109 has a construction in which a rotor magnet 111 is secured to a rotor shaft 110. Air gaps are defined between an outer peripheral surface of the rotor magnet 111 and inner peripheral surfaces of the stator yokes 106 of the stators 102. The rotor shaft 110 is rotatably supported by two bearings 108 secured to the cases 103.

FIG. 17 is a plan view of a stepping motor for driving a single coil such as used in a watch and the like. In FIG. 17, the reference numeral 201 denotes a stator comprised of a permanent magnet; numerals 202, 203 denote stators: and numerals 204 denote a coil.

However, in the conventional compact stepping motor shown in FIG. 15, since the cases 103, bobbins 101, stator coils 105 and stator yokes 106 are concentrically arranged around the rotor, the entire dimension of the motor becomes great. Further, as shown in FIG. 16, since magnetic flux generated by energization of the stator coil 105 mainly passes through an end face 106a1 of the stator tooth 106a and an end face 106b1 of the stator tooth 106b, the magnetic flux does not act on the rotor magnet 111 effectively, with the result that high output of the motor cannot be obtained.

Also regarding the motor shown in FIG. 17, magnetic flux generated by energization of the coil 204 is concentrated into the smallest gap between the rotor 201 and the stator 202 and does not act on the magnet effectively.

The inventors have proposed a motor solving the disadvantage of the conventional motor shown in FIG. 15, as disclosed in U.S. Pat. No. 5,831,356.

In this proposed motor, a cylindrical rotor comprises permanent magnets equidistantly disposed in a circumferential direction and having alternate magnetic poles; a first coil, a rotor and a second coil are sequentially disposed in an axial direction of the rotor; a first outer magnetic pole and a first inner magnetic pole, which are excited by the first coil, are opposed to outer and inner peripheral surfaces of the rotor and a second outer magnetic pole and a second inner magnetic pole, which are excited by the second coil, are opposed to the outer and inner peripheral surfaces of the rotor; and a rotary shaft (rotor shaft) is extended from the interior of the cylindrically arranged permanent magnets.

Although such a motor can have high output and small outer dimension, since the diametrical dimensions of the inner magnetic poles are small, it is difficult to manufacture magnetic teeth. Further, it has been requested that stable output having no vibration be obtained from a motor having a small diametrical dimension.

To this end, the inventors have recently proposed a motor in which inner magnetic poles have a configuration having good workability, as described in U.S. patent application Ser. No. 08/994,994, and also proposed a rotor in which output transmitting means, such as a gear or a pulley, can easily be attached to a rotary shaft having a small diametrical dimension and stable output having no vibration can be obtained, as described in U.S. patent application Ser. No. 09/022,474.

Recently, it has been requested to provide a motor having high output and super-compact size.

To this end, the inventors have recently proposed a motor constructed as a single phase motor to achieve high output and super-compact size, as described in U.S. patent application Ser. No. 09/293,063.

In recent years, it has been requested that such a motor having high output and super-compact size made be further highly accurate.

SUMMARY OF THE INVENTION

The present invention aims to eliminate the above-mentioned conventional drawbacks, and an object of the present invention is to provide a single-phase motor wherein a wide space within which a coil is wound is maintained to achieve higher output.

Another object of the present invention is to provide a motor in which a small diameter portion having a diameter smaller than of an inner magnetized pole portion is provided on an inner yoke and a coil is wound around the small diameter portion.

The other objects and features of the present invention will be apparent from the following detailed explanation.

DESCRIPTION OF THE PREFERRED EMBODIMENTS

The present invention will now be fully explained in connection with embodiments thereof with reference to the accompanying drawings.

Figure 1:
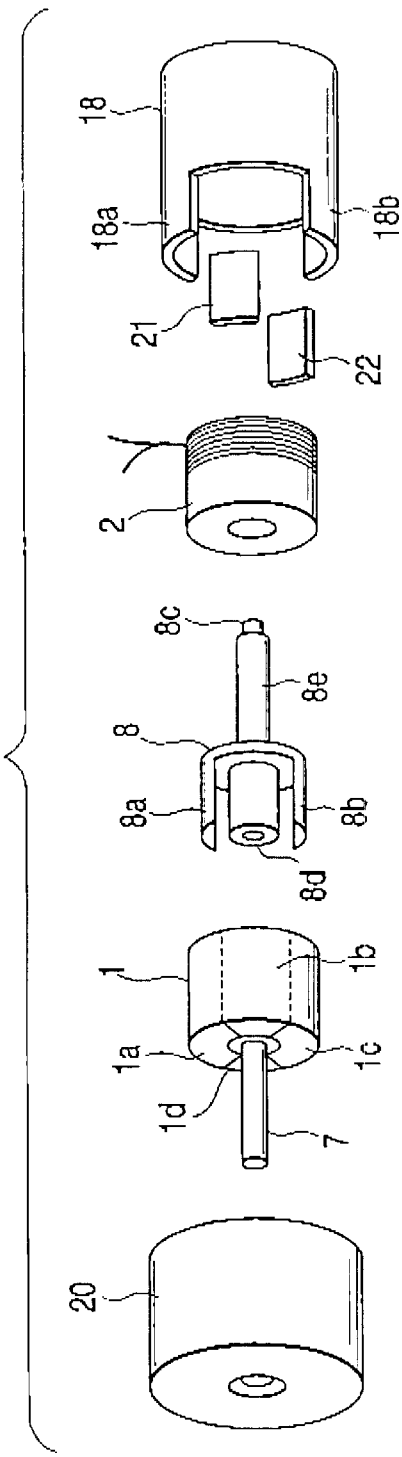
FIG. 1 is an exploded perspective view of a motor according to a first embodiment of the present invention.

While a first embodiment of the present invention is explained hereinbelow, a fundamental construction of a stepping motor according to the present invention will firstly be described with reference to FIGS. 1 and 2. FIG. 1 is an exploded perspective view of the stepping motor, and FIG. 2 is a sectional view of the stepping motor of FIG. 1 in an assembled condition.

Figure 2:
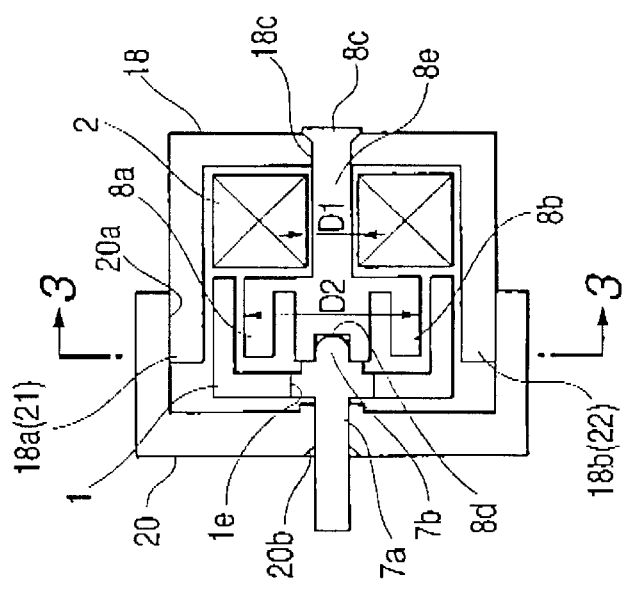
FIG. 2 is a sectional view of the motor of FIG. 1 in an assembled condition.

In FIGS. 1 and 2, a motor according to the present invention comprises a rotatable rotor magnet 1 magnetized alternately with different magnetic poles, a cylindrical outer yoke 18 opposed to the rotor magnet 1 with a gap, a cylindrical inner yoke 8 having notched cylindrical inner magnetic poles, and a coil 2 wound around a solid cylindrical portion (small diameter portion) of the inner yoke 8. A free end of the solid cylindrical small diameter portion is magnetically connected to the outer yoke 18, and an outer peripheral surface of the inner yoke 8 is opposed to an inner peripheral surface of the rotor magnet 1, and an end portion 7b of a rotary shaft portion of the rotor magnet 1 is rotatably received in a hole 8d of a solid cylindrical large diameter portion of the inner yoke 8, and there is provided holding means for holding the rotor magnet 1 in a position where the center of the rotor magnet 1 is deviated from a straight line connecting between the outer yoke 18 and the rotation center of the rotor magnet 1.

In the motor of the present invention having the above-mentioned construction, only by providing the small diameter portion (smaller than the inner yoke) on the inner yoke and by reducing the diameter of the small diameter portion, a wide space within which the coil is wound can be reserved, so that the coil can be wound around the small diameter portion greatly, thereby obtaining higher output in a single-phase motor.

Incidentally, in the following explanation, the present invention will be described with reference to a motor that is a stepping motor.

In FIGS. 1 and 2, the magnet (rotor magnet) 1 constituting a rotor has magnetized portions 1a, 1b, 1c, 1d obtained by dividing the magnet into n parts (four parts in the illustrated embodiment) in a circumferential direction and alternately magnetized to S and N poles. The magnetized portions 1a, 1c are magnetized to S poles and the magnetized portions 1b, 1d are magnetized to N poles. The centers of the magnetized portions 1a, 1b, 1c, 1d are shown by K1, K2, K3, K4 in FIG. 3. The magnet 1 is formed from plastic magnet material which can be injection-molded. By using such material, the radial thickness of the cylindrical magnet 1 can be minimized (very thin).

The rotor magnet 1 is provided at its center with a through hole constituting a fitting portion 1e having a small diameter. An output shaft (rotor shaft) 7 is press-fitted into the fitting portion 1e of the rotor magnet 1 to be secured to the magnet 1. Since the magnet 1 is formed from plastic by injection molding, the magnet is not cracked during the assembling, such as press-fitting of the output shaft 7.

Further, nevertheless the magnet 1 has a relatively complicated configuration in which the fitting portion 1e having small diameter is formed in the center of the through hole, it can easily be manufactured. Further, since the output shaft 7 is assembled and secured to the magnet 1 by the press-fit. the assembling is facilitated and the manufacturing cost becomes cheaper. The output shaft 7 and the magnet 1 constitute the rotor (rotor magnet) 1.

For example, as the material for the magnet 1, mixture obtained by blending rare earth magnetic powder of Nd—Fe—B group and thermoplastic resin binder is used, and such mixture is injection-molded to form the plastic magnet. Thus, in comparison with the face that a magnet manufactured by compression molding has bending strength of about 500 Kgf/cm$^2$, for example, polyamide resin is used as binder material, a bending strength more than 800 Kgf/cm$^2$ can be obtained, and a thin wall cylinder, which could not be achieved by the compression molding, can be obtained. When the magnet is constructed as the thin wall cylinder, performance of the motor is enhanced, as will be described later. Further, by using the plastic magnet, the configuration of the magnet can be freely selected, a configuration for securing the output shaft 7 (which cannot be achieved by compression-molding) can be integrated, and adequate output shaft securing strength can be obtained. Further, since excellent strength is given, even when the output shaft 7 is press-fitted into the magnet, the magnet and the output shaft 7 are not cracked.

At the same time, by integrally forming the output shaft securing portion, coaxial accuracy of the magnet portion with respect to the output shaft portion is enhanced, with the result that vibration can be minimized. Further, although the magnetic property of the injection-molded magnet is 5 to 7 MGOe in comparison with magnetic property of 8 MGOe or more of the compression magnet, adequate output torque of the motor can be obtained.

Further, since the injection-molded magnet has a thin resin surface film, generation of rust is greatly suppressed in comparison with the compression magnet. Thus, anti-rust treatment such as painting can be omitted. The injection-molded magnet does not create a problem regarding adhesion of magnetic powder which would be caused in the compression magnet. Further, since there is no swelling of a surface which would be easily caused in anti-rust painting, the quality of the magnet is improved.

In FIGS. 1 and 2, the cylindrical coil 2 is disposed in coaxial with the magnet 1 side by side in an axial direction and has an outer diameter substantially the same as that of the magnet 1.

The inner yoke 8 is formed from soft magnetic material and comprises inner magnetized portions 8a, 8b formed by notching one cylindrical end thereof, the large diameter portion having the hole 8*d* at its free end, and the small diameter portion 8*e* having a diameter smaller than those of the inner magnetized portions 8*a*, 8*b* and having a tip end 8*c*. The coil 2 is inserted onto the small diameter portion 8*e* of the inner yoke 8.

The phases of the inner magnetic poles 8*a* and 8*b* are deviated from each other by 360/(n/2) degrees, i.e., 180 degrees (when there are four magnetic poles as is in the illustrated embodiment) so that the magnetic poles have the same phases. The stator 18 is made of soft magnetic material the same as that of the inner yoke 8 and has an outer cylinder and a bottom surface portion having a center through hole 18*c*. A tip end portion of the outer cylinder of the outer yoke 18 constitutes outer magnetized portions 18*a*, 18*b*. The tip end 8*c* of the inner yoke 8 is assembled into the through hole 18*c* of the outer yoke 18, by mechanical caulking or adhesive, so that the outer magnetized portions 18*a*, 18*b* of the outer yoke 18 are opposed to the inner magnetized portions 8*a*, 8*b* of inner yoke 8. The inner yoke 8 and the outer yoke 18 integrally assembled in this way constitute the stator and excited by supplying electricity the coil 2 inserted on the small diameter portion 8*e* of the inner yoke 8.

In FIG. 2, D1 indicates an inner diameter of the coil 2 and D2 indicates a distance between the inner magnetized portions 8*a* and 8*b* of the inner yoke 8. D1 is selected to be smaller than D2. The reason why the inner diameter D1 of the coil 2 is made small is that, since the small diameter portion 8*e* of the inner yoke 8 may have smallest volume that permits magnetic connection to the outer yoke 18, an adequate amount of coil 2 can be wound around the small diameter portion 8*e* of the inner yoke 8. Accordingly, the number of windings of the coil can be increased to increase a magnetomotive force (ampere-turn), with the result that the forces of the excited outer and inner magnetized portions acting on the magnetized portion of the rotor magnet are increased, thereby enhancing a rotational force (starting force) of the rotor magnet.

The reason why the distance D2 between the inner magnetized portions 8*a* and 8*b* of the inner yoke 8 is that, as mentioned above, since the radial thickness of the cylindrical rotor magnet 1 can be made very small, the radial thickness of the cylindrical rotor magnet 1 is minimized as small as possible so that the interior of the rotor magnet 1 can be fully utilized accordingly to increase the distance D2 between the inner magnetized portions 8*a* and 8*b*. with the result that gaps between the inner magnetized portions 8*a*, 8*b* and the opposed outer magnetized portions 18*a*, 18*b* can be made very small. As a result, the reluctance of a magnetic circuit constituted by the coil 2, inner yoke 8 and outer yoke 18 can be minimized, so that a great magnetic flux is generated with smaller apply current, thereby improving the rotational force of the rotor magnet 1.

The outer magnetized portions 18*a*, 18*b* are constituted by the notches and teeth extending in parallel with the shaft. With this arrangement, the magnetic poles can be formed while minimizing the diameter of the motor. Namely, if the outer magnetic poles are constituted by protrusions and recesses extending in a radial direction, the diameter of the motor is increased accordingly; however, in the illustrated embodiment, since the outer magnetized portions are constituted by the notches and the teeth extending in parallel with the shaft, the diameter of the motor can be minimized.

The inner magnetized portions 8*a*, 8*b* of the inner yoke 8 and the outer magnetized portions 18*a*, 18*b* of the outer yoke 18 are disposed in such a manner that they are opposed to outer and inner peripheral surfaces of one end portion of the rotor magnet 1 to pinch the one end portion of the rotor magnet 1 therebetween. One end 7*d* of the output shaft 7 is rotatably received in the hole 8 *d* of the inner yoke 8. Accordingly, since the magnetic flux generated by the coil 2 traverses across the magnet (rotor) 1 between the inner magnetized portions 8*a*, 8*b*, and the outer magnetized portions 18*a*, 18*b*, the magnetic flux acts on the magnet (rotor) effectively, thereby enhancing the output of the motor.

Further, as mentioned above, the magnet 1 is formed from the plastic magnet material by the injection molding, the thickness of the cylinder in the radial direction can be reduced greatly. As a result, the distances between the inner magnetized portions 8*a*, 8*b* and the outer magnetized portions 18*a*, 18*b* can be minimized, thereby reducing magnetic reluctance of the magnetic circuit constituted by the coil 2 and the magnetic poles. Thus, much magnetic flux can be generated by smaller current, thereby enhancing the output of the motor, reducing electric power consumption and making the coil more compact.

A cover (cylindrical member) 20 is made of non-magnetic material, and outer diameter portions of the outer yoke 18 (on which the magnetized portions 18*a*, 18*b* are formed) are fitted within an interior 20*a* of the cover 20 and are secured to the cover by adhesive or the like. A shaft portion 7*a* of the output shaft 7 is rotatably fitted in a through hole (bearing) 20*b* of the cover 20 and one end portion 7*b* is rotatably fitted in the hole (bearing) 8*d* of the inner yoke 8.

FIGS. 3 to 6 are explanatory views for successively explaining the operation of the motor of FIGS. 1 and 2 with reference a sectional view taken along the line 3—3 in FIG. 2. In FIGS. 3 to 6, "Q1" presents the center of the outer magnetized portion 18*a* of the outer yoke 18, "Q2" represents the center of the outer magnetized portion 18*b*, and "Q3" represents the rotational center of the rotor magnet 1. Positioning stators 21, 22 are made of soft magnetic material and are secured within the interior chamber 20*a* (FIG. 2) of the cover 20.

Figure 3:
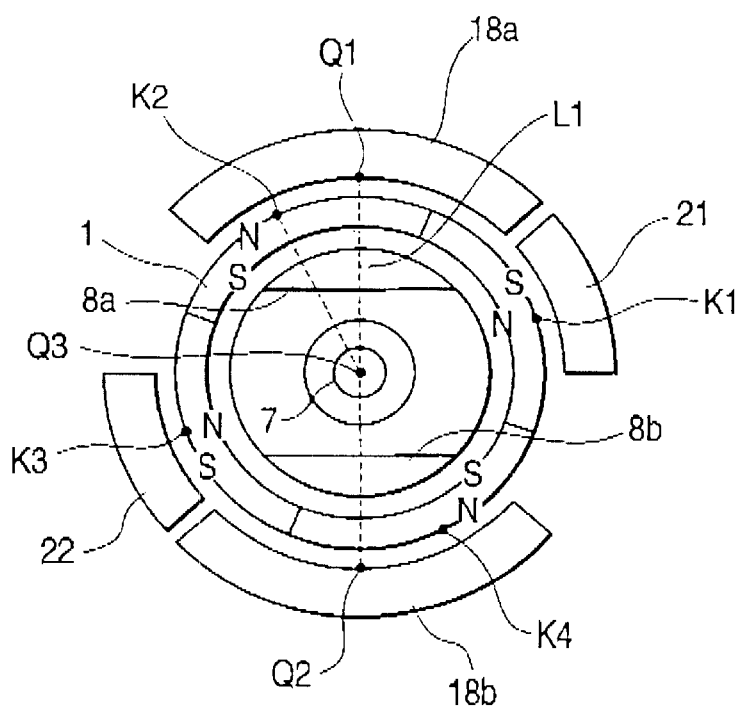
FIG. 3 is the view showing a relationship between a rotor and a stator of the motor of FIG. 1, under a condition that electricity is not supplied to a coil of the motor.
Figure 4:
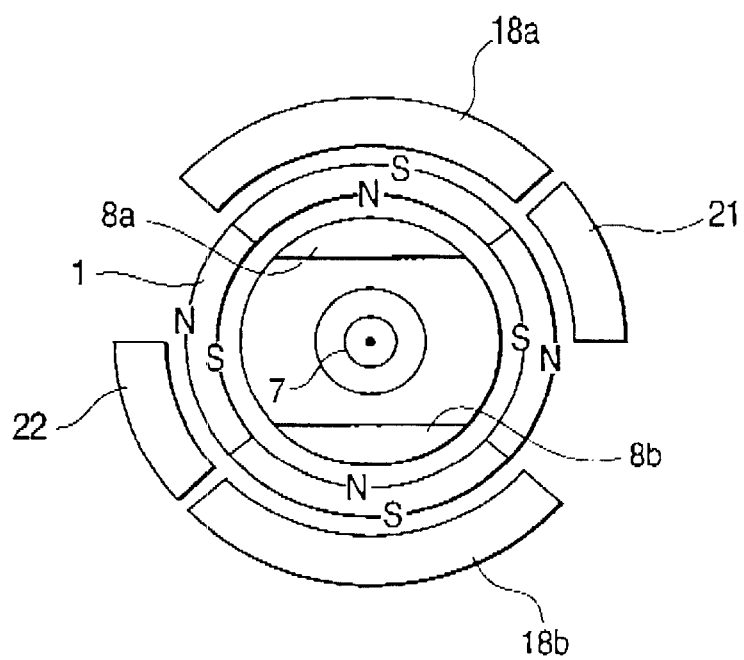
FIG. 4 is a view showing the motor under a condition that, from the condition of FIG. 3, the electricity is supplied to the coil.

The positioning stators 21, 22 are opposed to the outer peripheral surface of the rotor magnet 1. As shown in FIG. 3, the positioning stator 21 is arranged near the outer magnetized portion 18*a* between the outer magnetized portions 18*a* and 18*b*. The other positioning stator 22 is arranged near the outer magnetized portion 18*b* between the outer magnetized portions 18*a* and 18*b*, as shown in FIG. 3. The positioning stator 21, 22 are not contacted with the outer yoke 18 and are not opposed to the inner magnetized portions 8*a*, 8*b* of the inner yoke 8 or are sufficiently spaced apart from the inner magnetized portions 8*a*, 8*b*. Accordingly, even when the electricity is supplied to the coil 2, the positioning stators are almost not magnetized, unlike to the outer magnetized portions 18*a*, 18*b*, thereby not contributing to the driving of the rotor magnet 1.

By the presence of the positioning stators 21, 22, when the electricity is not supplied to the coil 2, the magnet 1 is stopped at a position shown in FIG. 3. That is to say, the stop position is selected so that the centers K1, K2, K3, K4 of the magnetized portions of the magnet 1 are stopped at positions (as shown in FIG. 3) deviated from the straight line L1 connecting between the centers of the outer magnetized portions 18*a*, 18*b* of the outer yoke 18 and the rotational center of the magnet 1. For example, the center K2 is stopped at a position where the center is deviated from the straight line L1 by an angle θ. In this position, when the electricity is supplied to the coil 2, as mentioned above, the positioning stator 21, 22 are not magnetized, but the outer magnetized portions 18*a*, 18*b* and the inner magnetized portions 8a, 8b are magnetized, and forces of the magnetized outer magnetized portions 18a, 18b acting on the magnetized portions of the magnet 1 always are directed toward the rotational direction of the magnet 1. Thus, the driving of the magnet (rotor magnet) 1 can be started smoothly.

Figure 13:
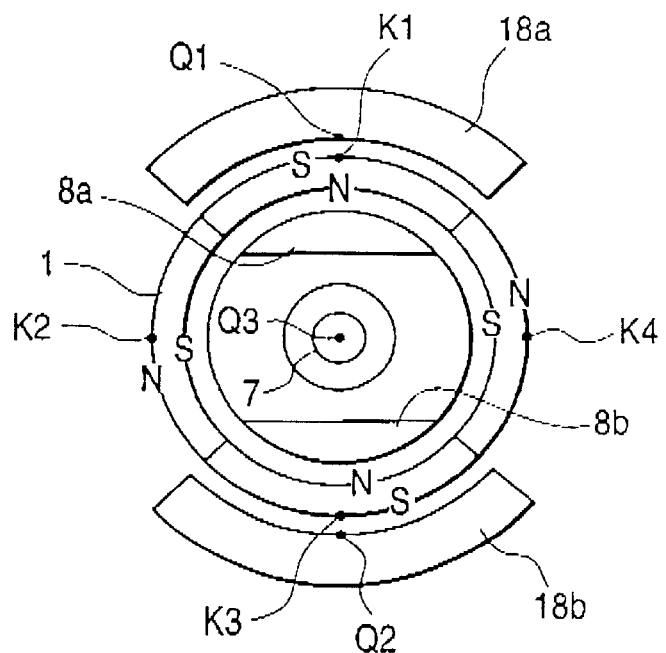
FIG. 13 is a view showing the relationship between a rotor and a stator of a motor having initial positioning means, under a first stable condition in which electricity is not supplied to a coil of the motor.
Figure 14:
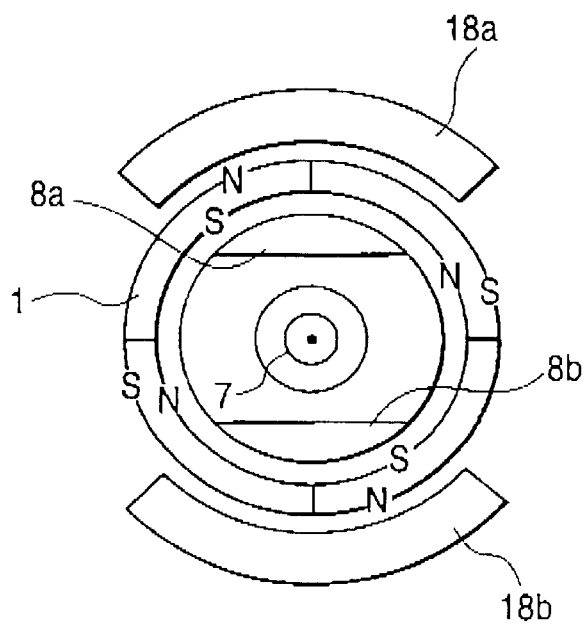
FIG. 14 is a view showing a second stable condition in which electricity is not supplied to the coil.
Figure 15:
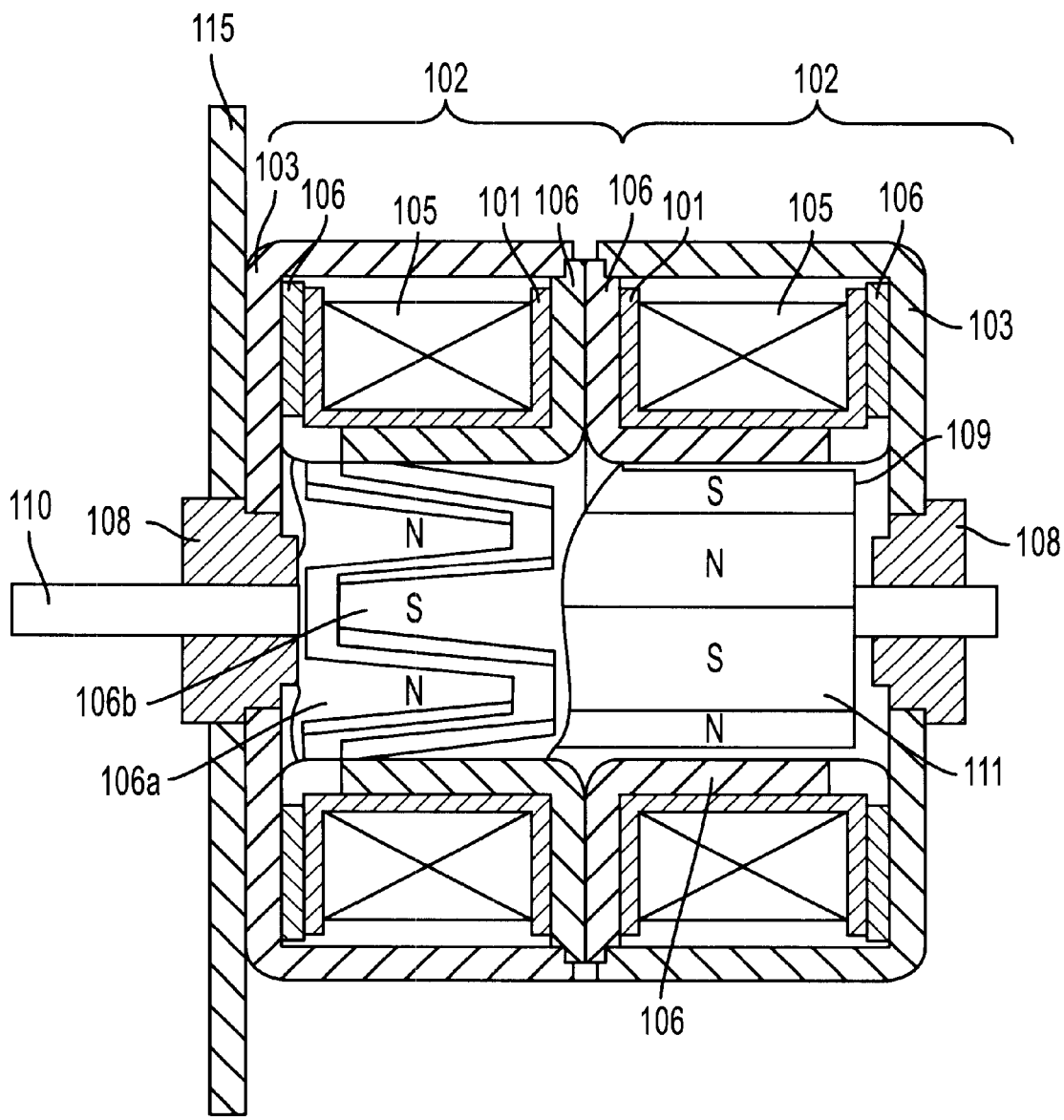
FIG. 15 is a sectional view showing a conventional stepping motor.
Figure 16:
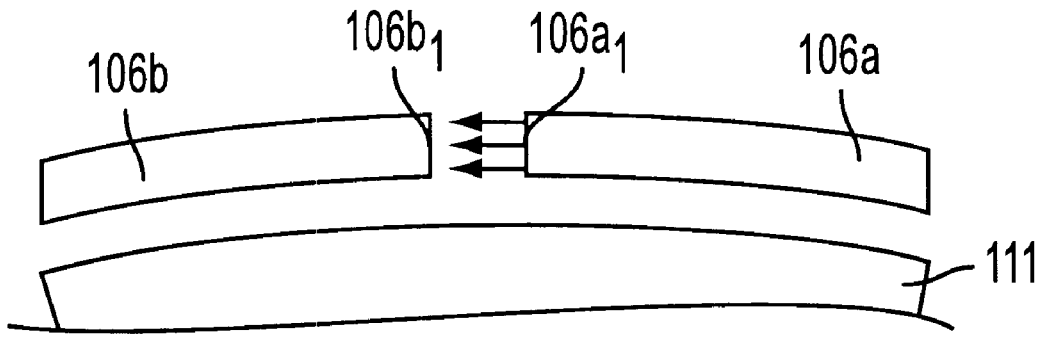
FIG. 16 is a view for explaining magnetic flux in the conventional stepping motor of FIG. 15.
Figure 17:
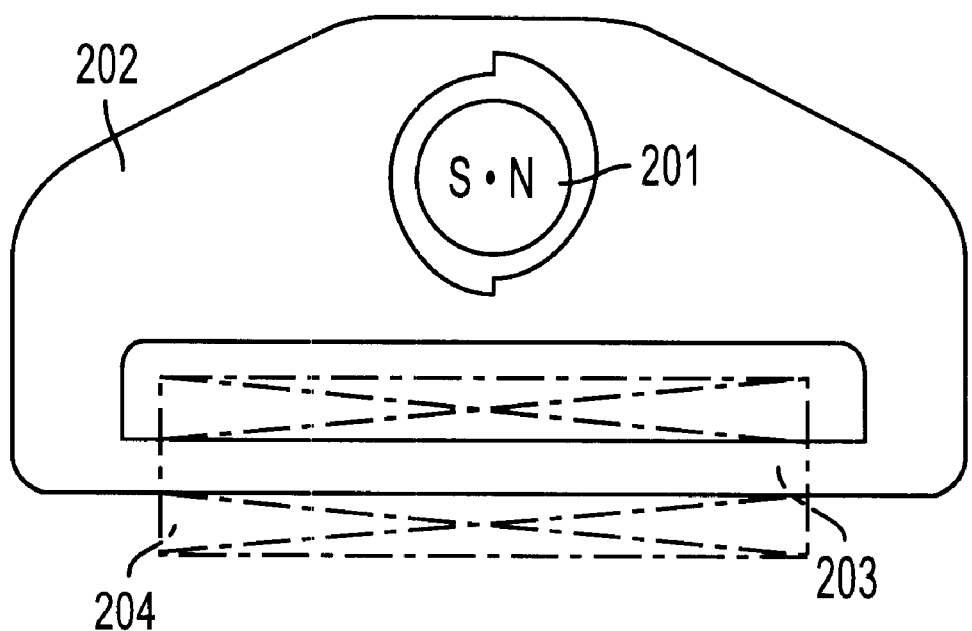
FIG. 17 is a plan view of a conventional single-phase motor.

If the positioning stators 21, 22 are not provided, when the electricity is not supplied to the coil 2, the magnet 1 is stably stopped at either a position shown in FIG. 13 or a position shown in FIG. 14. FIGS. 13 and 14 are schematic sectional views showing such stable stop positions. In the position shown in FIG. 13, since the centers K1, K2, K3, K4 of the magnetized portions of the magnet 1 are positioned on the straight line connecting between the centers Q1, Q2 of the outer magnetized portions and the rotational center Q3 of the magnet 1, even when the electricity is supplied to the coil 2, the magnetic force does not act toward the direction for rotating the magnet 1.

In the position shown in FIG. 14, although the magnet 1 can be driven by the energization of the coil 2, so long as the energizing timing is not changed appropriately, the stable rotation of the magnet cannot be achieved. That is to say, from the condition shown in FIG. 14, when the outer magnetized portions 18a, 18b are magnetized to N poles, for example, even if the outer magnetized portions 18a, 18b are magnetized to S poles by reversing the energizing direction of the coil 2 after the magnet 1 was stopped at the same position as that shown in FIG. 13, as explained in connection with FIG. 13, the magnetic force does not act toward the direction for rotating the magnet 1. The positioning stators 21, 22 and the rotor magnet 1 constitute holding means for holding the magnet 1. Further, since the positioning stators 21, 22 are positioned between the outer magnetized portions 18a and 18b of the outer yoke 18, the size of the motor is not increased.

Next, an operation of the stepping motor according to the present invention will be explained with reference to FIGS. 3 to 6. From the condition shown in FIG. 3, when the electricity is supplied to the coil 2 to magnetize the outer magnetized portions 18a, 18b of the outer yoke 18 to N poles and the inner magnetized portions 8a, 8b of the inner yoke 8 to S poles, the magnet 1 as the rotor is rotated in an counter-clockwise direction to reach a condition shown in FIG. 4. Since the positioning stators 21, 22 are almost not magnetized by the coil 2, the position of the magnet is substantially determined by the magnetized portions of the magnet 1 and the magnetized conditions of the outer magnetized portions 18a, 18b of the outer yoke 18 and the inner magnetized portions 8a, 8b of the inner yoke 8 obtained by the energization of the coil 2 (condition shown in FIG. 4).

Figure 5:
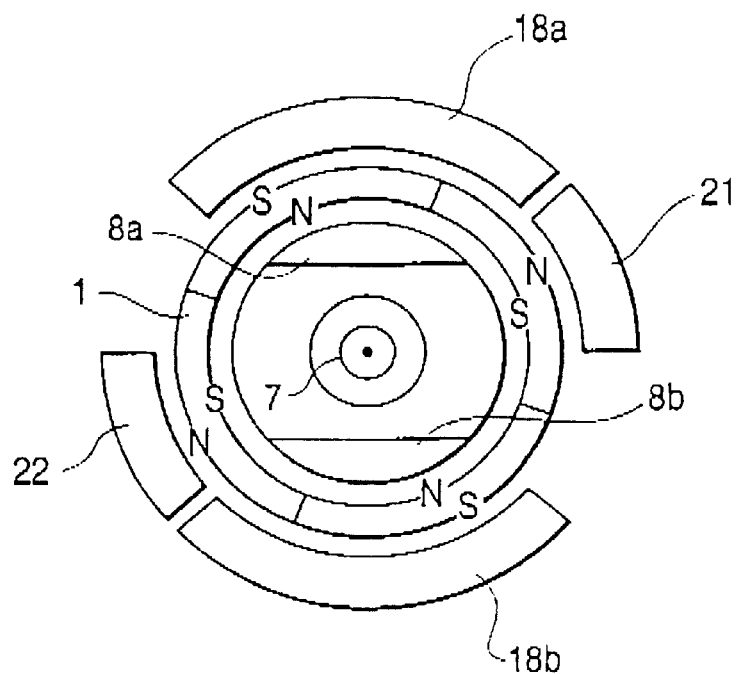
FIG. 5 is a view showing the motor under a condition that, from the condition of FIG. 4, the electricity to the coil is interrupted.

From this condition, when the coil 2 is disenergized, a condition shown in FIG. 5 which is stabilized by the magnetic force of the magnet 1 is established.

Figure 6:
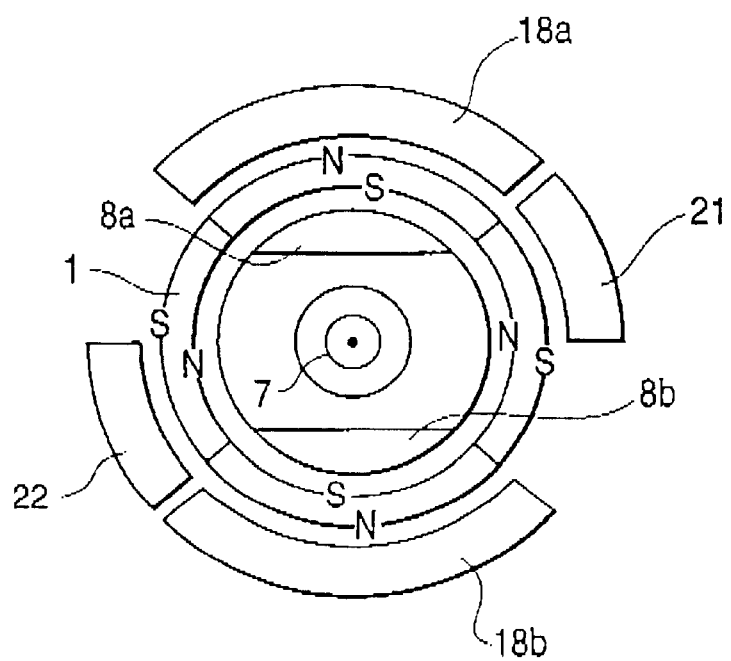
FIG. 6 is a view showing the motor under a condition that, from the condition of FIG. 5, the electricity to the coil is reversed.

Then, when the energizing direction of the coil 2 is reversed to magnetize the outer magnetized portions 18a, 18b of the outer yoke 18 to S poles and the inner magnetized portions 8a, 8b of the inner yoke 8 to N poles, the magnet 1 as the rotor is further rotated in the counter-clockwise direction to reach a condition shown in FIG. 6. Thereafter, by switching the energizing direction of the coil 2 alternately, the magnet 1 as the rotor is successively rotated to the positions corresponding to the energized phases, thereby rotating the motor. From a condition that the motor is rotating, when the electricity to the coil 2 is interrupted, the motor is stopped at the position shown in FIG. 3 which is stabilized by the magnetic force of the magnet 1.

According to the aforementioned embodiment, the diameter of the motor may be the extent that the magnetized portions of the outer yoke 18 can be opposed to the outer peripheral surface of the magnet 1, and the length of the motor may be a length obtained by adding the length of the coil 2 to the length of the magnet 1. Thus, since the dimension of the motor is determined by the diameters and lengths of the magnet 1 and the coil 2, when the lengths of the magnet and the coil are made minimum, a super-compact motor can be obtained. That is to say, the diameter of the motor is substantially determined by the outer magnetized portions 18a, 18b opposed to the outer peripheral surface of the magnet 1, and the axial length of the motor is determined by the side-by side arrangement of the coil 2 and the rotor magnet 1 in the axial direction, so that the motor can be made very compact.

Further, since the magnetic flux generated by the coil 2 extends across the magnet between the outer magnetized portions and the inner magnetized portions, the magnetic flux acts effectively. Further, since the holding means constituted by the rotor magnet 1 and the positioning stator 21, 22 opposed to the outer peripheral surface of the magnet 1 is provided, when the electricity is not supplied to the coil 2, the magnet 1 can be held at the position where the centers of the poles of the magnet 1 are deviated from the straight line connecting between the centers of the outer magnetized portions and the rotational center Q3 of the magnet 1, and, accordingly, from the condition that the motor is stopped, when the electricity is firstly supplied to the coil 2, the force of the magnetic flux (generated by the coil 2) acting on the magnet 1 does not direct the rotational center of the magnet 1, thereby driving the motor smoothly and stably.

Further, the motor can be constructed with the few number of parts (rotor magnet 1, coil 2, inner yoke 8. outer yoke 18 and output shaft 7), thereby reducing the cost of the motor. In addition, since the rotor magnet 1 is formed as the hollow cylinder and the outer magnetized portions 18a, 18b and the inner magnetized portions 8a, 8b are opposed to the outer and inner peripheral surfaces of the hollow cylindrical rotor magnet 1, effective output of the motor can be obtained. The output shaft 7 is secured in the fitting portion (central hole) 1e of the rotor magnet 1 by press-fit. Since the rotor magnet 1 is formed from the plastic material by injection-molding, even when the assembling is effected by the press-fit, the rotor magnet 1 is not cracked, and, nevertheless the magnet has a complicated configuration in which the fitting portion 1e having small diameter is formed in the center of the through hole, it can easily be manufactured. Further, since the output shaft 7 is assembled and secured to the magnet 1 by the press-fit, the assembling is facilitated and the manufacturing cost becomes cheaper.

Now, the reason why the above-mentioned stepping motor according to the illustrated embodiment has the optimum construction for a super-compact motor will be further explained.

First, the rotor magnet 1 is formed as the hollow cylindrical shape, second, the outer peripheral surface of the rotor magnet 1 is divided into plural sections which are alternately magnetized, third, the coil 2 and the rotor magnet 1 are disposed side by side in the axial direction of the magnet, fourth, the outer magnetized portions 18a, 18b of the outer yoke 18 and the inner magnetized portions 8a, 8b of the inner yoke 8 which are magnetized by the coil 2 are opposed to the outer and inner peripheral surfaces of the rotor magnet 1, fifth, the outer magnetized portions 18a, 18b are formed by the notches and teeth extending in parallel with the shaft, sixth, the volume of the small diameter portion 8e of the inner yoke 8 is reduced to permit the adequate winding of the coil 2 around the small diameter portion, and, seventh, there is provided the holding means for holding the rotor magnet 1 in such a manner that the centers of the magnetized portions of the rotor magnet 1 are positioned at the positions deviated from the straight line connecting between the centers of the outer magnetized portions 18a, 18b and the rotational center Q3 of the rotor magnet 1 when the electricity is not supplied to the coil 2.

The diameter of the stepping motor (motor) may be the extent that the magnetized portions of the outer yoke 18 can be opposed to the diameter of the rotor magnet 1, and the length of the stepping motor may be a length obtained by adding the length of the coil 2 to the length of the rotor magnet 1. Thus, since the dimension of the motor is determined by the diameters and lengths of the rotor magnet 1 and the coil 2, when the lengths of the rotor magnet 1 and the coil 2 are made minimum, a super-compact motor can be obtained.

In this case, if the diameters and lengths of the rotor magnet 1 and the coil 2 are extremely reduced, it will be very difficult to maintain the accuracy of the motor. However, in the illustrated embodiment, the problem regarding the accuracy of the motor is solved by utilizing the simple arrangement in which the rotor magnet 1 is formed as the hollow cylindrical shape and the outer and inner magnetized portions 18a. 18b and 8a, 8b are opposed to the outer and inner peripheral surfaces of the hollow cylindrical rotor magnet 1. In this case, when magnetized portions by dividing the inner peripheral surface of the magnet into plural sections are also provided on the inner peripheral surface as well as the outer peripheral surface, or when the volume of the small diameter portion 8e of the inner yoke 8 is reduced as small as possible to permit the adequate winding of the coil 2 thereby to increase the magnetomotive force (ampere-turn), the output of the motor can be further enhanced.

Further, since the holding means for holding the rotor magnet 1 at the deviated position is provided, when the electricity is (firstly) supplied to the coil 2, from the condition that the motor is stopped, the force generated by the coil 2 and acting on the magnet 1 is not directed toward the rotational center of the magnet 1, thereby starting the motor smoothly and stably.

Further, as mentioned above, the rotor magnet 1 is formed from the plastic magnet material by the injection-molding, so that the radial thickness of the cylinder can be made very thin. Thus, the distances or gaps between the outer magnetized portions 18a, 18b of the outer yoke 18 and the inner magnetized portions 8a, 8b of the inner yoke 8 can be made very small, so that the reluctance of the magnetic circuit formed by the coil 2, outer yoke 18 and inner yoke 8 can be reduced. As a result, great magnetic flux can be generated with a smaller current, thereby enhancing the output of the motor, reducing the power consumption and making the coil more compact.

Repeating again, in the illustrated embodiment, since the small diameter portion 8e of the inner yoke 8 may have smallest volume which permits magnetic connection to the outer yoke 18, an adequate amount of coil 2 can be wound around the small diameter portion 8e of the inner yoke 8. Accordingly, the number of windings of the coil can be increases to increase magnetomotive fore (ampere-turn), with the result that forces of the excited outer and inner magnetized portions acting on the magnetized portion of the rotor magnet are increased, thereby enhancing the rotational force (starting force) of the rotor magnet.

Further, since the radial thickness of the cylindrical rotor magnet 1 can be made very small, the radial thickness of the cylindrical rotor magnet 1 is minimized as small as possible so that the interior of the rotor magnet 1 can be fully utilized accordingly to increase the distance D2 between the inner magnetized portions 8a and 8b, with the result that gaps between the inner magnetized portions 8a, 8b and the opposed outer magnetized portions 18a, 18b can be made very small. As a result, reluctance of a magnetic circuit constituted by the coil 2, inner yoke 8 and outer yoke 18 can be minimized, so that great magnetic flux is generated with smaller apply current, thereby improving the rotational force of the rotor magnet 1.

Next, a second embodiment of the present invention will be explained with reference to FIGS. 7 to 12. Incidentally, the same elements as those in the first embodiment are designated by the same reference numerals and concrete explanation thereof will be omitted.

Figure 7:
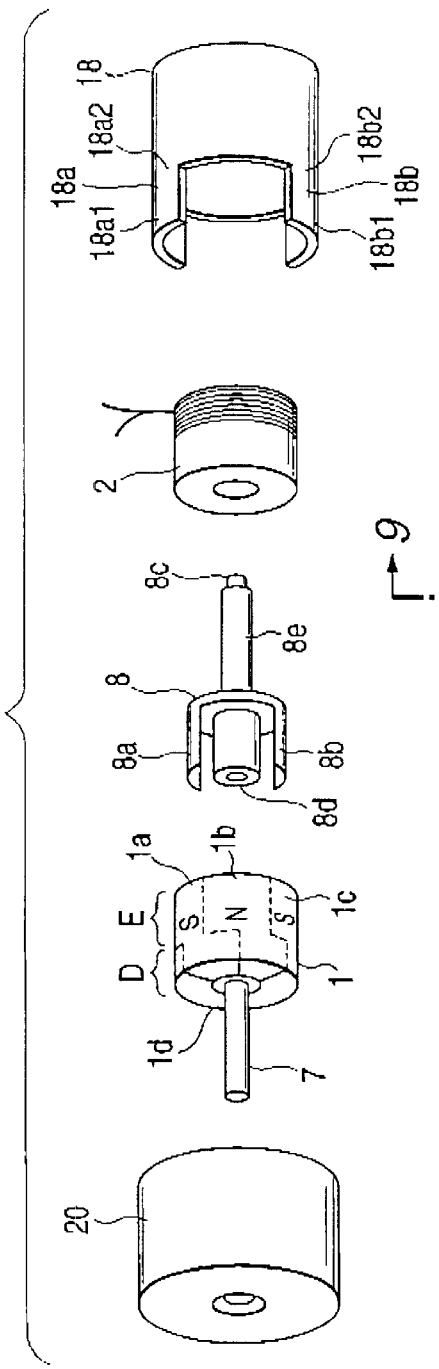
FIG. 7 is an exploded perspective view of a motor according to a second embodiment of the present invention.
Figure 8:
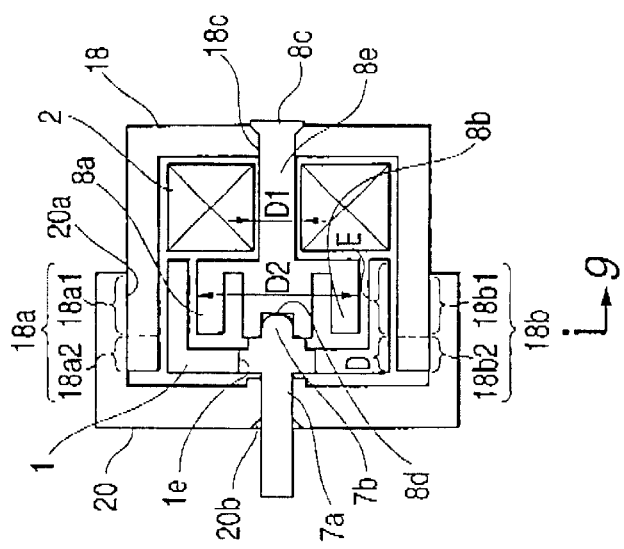
FIG. 8 is a sectional view of the motor of FIG. 7 in an assembled condition.

FIG. 7 is an exploded perspective view of a motor according to a second embodiment of the present invention, FIG. 8 is a sectional view of the motor of FIG. 7 in an assembled condition, and FIGS. 9 to 12 are sectional views taken along the line 9—9 in FIG. 8, for successively explaining the operation of the motor shown in FIGS. 7 and 8.

The second embodiment also illustrates an example that the motor is a stepping motor. In the second embodiment, outer magnetized portions 18a, 18b of an outer yoke 18 are further extended to act as holding means. However, the facts that the inner diameter D1 of the coil 2 is smaller than the distance D2 between the inner magnetized portions 8a, and 8b of the inner yoke 8 to permit adequate winding of the coil on the small diameter portion 8e of the inner yoke 8 and that gaps between the inner magnetized portions 8a, 8b of the inner yoke 8 and the opposed outer magnetized portions 18a, 18b of the outer yoke 18 can be made very small are the same as those in the first embodiment. Accordingly, it can be said that it is possible to improve the rotational force of the rotor magnet 1.

Now, differences with respect to the first embodiment will be described.

The outer magnetized portions 18a, 18b comprise sections 18a1, 18b1 opposed to the inner magnetized portions 8a, 8b, and extended sections 18a2, 18b2. Since the extended sections 18a2, 18b2 are not opposed to the inner magnetized portions 8a, 8b, even when the electricity is supplied to the coil 2, the extended sections are almost not magnetized in comparison with the opposed sections 18a1, 18b1, thereby not generating the driving force.

Figure 9:
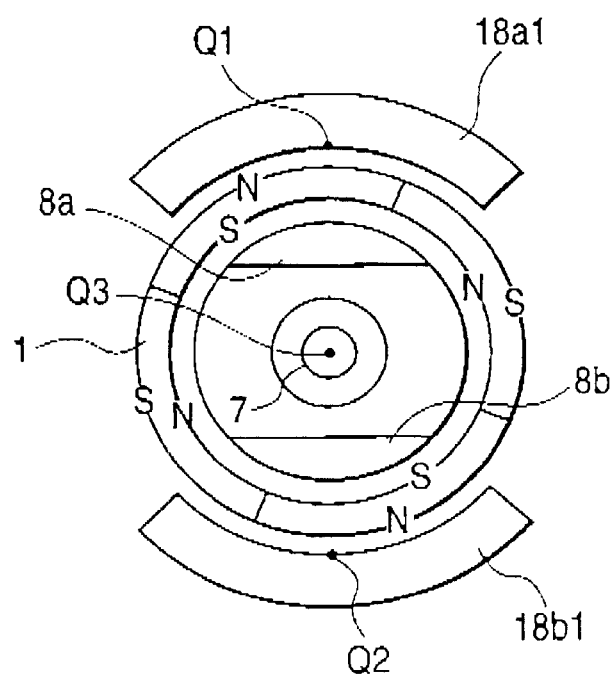
FIG. 9 is a view showing the relationship between a rotor and a stator of the motor of FIG. 8, under a condition that electricity is not supplied to a coil of the motor.

As shown in FIG. 7, a rotor magnet 1 has areas E opposed to the opposed sections 18a1, 18b1 and areas D opposed to the extended sections 18a2, 18b2, which areas have different magnetized phases. Thus, as shown in FIG. 9, when the electricity is not supplied to the coil 2, the areas E of the magnet 1 are held at positions deviated from a straight line connecting between centers of the sections 18a1, 18b1 (magnetized by the coil 2) of the outer magnetized portions 18a, 18b and a rotation center of the magnet 1. On the other hand, since the extended sections 18a2, 18b2 are not opposed to the inner magnetized portions 8a, 8b, even when the electricity is supplied to the coil 2, the extended sections are almost not magnetized in comparison with the sections 18a1, 18b1, thereby not generating the driving force. Accordingly, since the flux generated by the energization of the coil 2 extends substantially between the sections 18a1, 18b1 and the inner magnetized portions 8a, 8b, the force acting on the rotor magnet is not directed toward the center of the rotor magnet 1, with the result that the driving of the magnet can be driven stably and smoothly.

Even when the electricity is supplied to the coil 2, the extended sections 18a2, 18b2 are almost not magnetized in comparison with the sections 18a1, 18b1 and thus do not almost affect an influence upon the driving force generated by the energization of the coil 2, thereby picking up the stable output from the motor. In the illustrated embodiment, the holding means for holding the magnet 1 at the position where the centers of the poles of the magnet 1 are deviated from the straight line connection between the centers of the outer magnetized portions 18a, 18b and rotation center Q3 of the magnet 1 is constituted by the extended sections 18a1, 18b1 opposed to the outer peripheral surface of the magnet 1.

The extended sections 18a1, 18b1 correspond to the positioning stators 21, 22 of the first embodiment and form positioning stators integrally formed with the outer magnetized portions 18a, 18b.

Next, an operation of the motor (stepping motor) according to the second embodiment will be explained with reference to FIGS. 9 to 12. From the condition shown in FIG. 9, when the electricity is supplied to the coil 2 to magnetize the outer magnetized portions 8a, 8b to S poles, the magnet 1 as the rotor is rotated in an counter-clockwise direction to reach a condition shown in FIG. 10.

Figure 10:
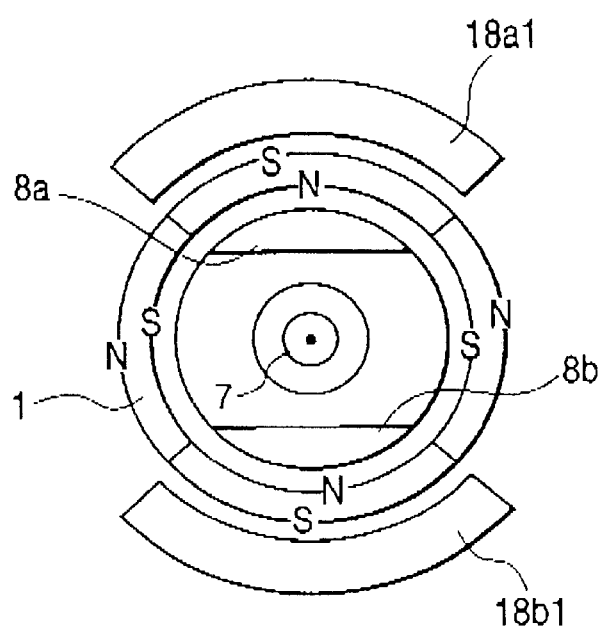
FIG. 10 is a view showing the motor under a condition that, from the condition of FIG. 9, the electricity is supplied to the coil.

Since the extended sections 18a2, 18b2 corresponding to the positioning stators are almost not magnetized by the coil 2, the position of the magnet 1 is substantially determined by the magnetized portions of the magnet 1 and the magnetized conditions of the outer magnetic poles 18a and the inner magnetic poles 18c, 18d of the stator 18 obtained by the energization of the coil 2 (condition shown in FIG. 10).

Figure 11:
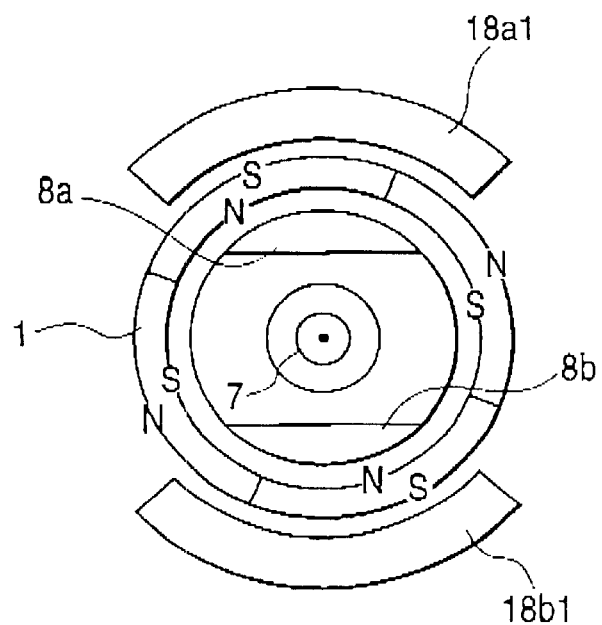
FIG. 11 is a view showing the motor under a condition that, from the condition of FIG. 10, the electricity to the coil is interrupted.

From this condition, when the coil 2 is disenergized, a condition shown in FIG. 11 which is stabilized by the magnetic force of the magnet 1 is established.

Figure 12:
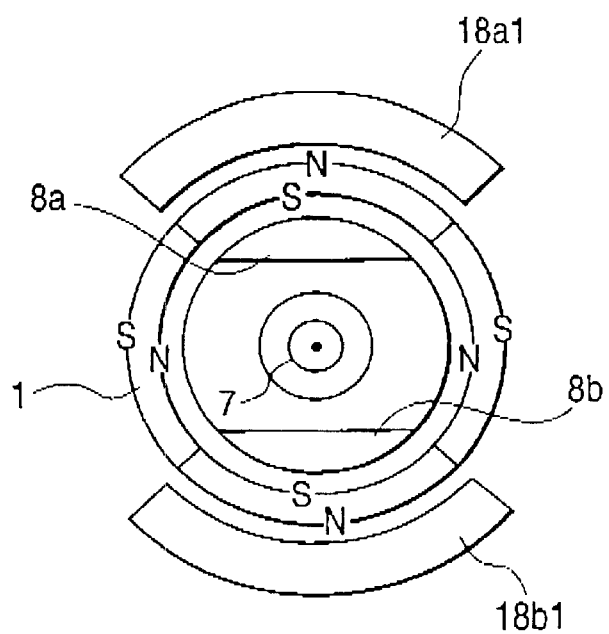
FIG. 12 is a view showing the motor under a condition that, from the condition of FIG. 11, the electricity to the coil is reversed.

Then, when the energizing direction of the coil 2 is reversed to magnetize the outer magnetized portions 18a, 18b of the outer yoke 18 to S poles and the inner magnetized portions 8a, 8b to N poles, the magnet 1 as the rotor is further rotated in the anti-clockwise direction to reach a condition shown in FIG. 12. Thereafter, by switching the energizing direction of the coil 2 alternately, the magnet 1 as the rotor is successively rotated to the positions corresponding to the energized phases, thereby rotating the motor.

From a condition that the motor is rotating, when the energization of the coil 2 is interrupted, the motor is stopped at the position shown in FIG. 9 which is stabilized by the magnetic force of the magnet 1.

The embodiment shown in FIGS. 7 to 12 differs from the embodiment shown in FIGS. 1 to 6 in the above-mentioned points. Accordingly, according to the embodiment shown in FIGS. 7 to 12, not only the same effects as those in the embodiment shown in FIGS. 1 to 6 can be achieved, but also the following effect can be obtained. According to the embodiment shown in FIGS. 7 to 12, since the holding means is constituted by the extended sections 18a2, 18b2 integrally formed with the outer magnetized portions of the outer yoke 18 and the magnet 1, the number of parts is further reduced to facilitate the assembling and to reduce the cost.

Further, similar to the above-mentioned embodiment, the diameter of the stepping motor may be the extent that the magnetized portions of the outer yoke 18 can be opposed to the outer peripheral surface of the magnet 1, and the length of the motor may be a length obtained by adding the length of the coil 2 to the length of the magnet 2. Thus, since the dimension of the motor is determined by the diameters and lengths of the magnet 1 and the coil 2, when the lengths of the magnet 1 and the coil 2 are made minimum, a super-compact motor can be obtained.

In this case, if the diameters and lengths of the magnet 1 and the coil 2 are extremely reduced, it will be very difficult to maintain the accuracy of the stepping motor. However, in the illustrated embodiment, the problem regarding the accuracy of the stepping motor can be solved by utilizing the simple arrangement in which the outer magnetized portions 18a, 18b of the outer yoke 18 and the inner magnetized portions 8a, 8b of the inner yoke 8 are opposed to the outer and inner peripheral surfaces of the hollow cylindrical magnet 1. In this case, when magnetized portions are also provided on the inner peripheral surface of the magnet by dividing the inner surface by plural sections as well as the outer peripheral surface, the output of the motor can be further enhanced.

Incidentally, in the above-mentioned embodiments, while an example that the hole 8d as the bearing is formed in the end of the larger diameter portion of the inner yoke 8 was explained, the length of the large diameter portion may be minimized and the hole 8d may be formed in the end thereof in the vicinity of the coil 2. The hole 8d may be located at any position between the illustrated position and a position in the vicinity of the coil 2.

As apparent from the above explanation, according to the present invention, first, the motor is constituted by the rotatable rotor magnet having the outer peripheral surface at least magnetized with different poles alternately in the circumferential direction, the cylindrical outer yoke opposed to the rotor magnet with the gap therebetween, the cylindrical inner yoke having the notched cylindrical inner magnetized portions, and the coil wound around the solid cylinder-shaped small diameter portion of the inner yoke; and the free end of the small diameter portion of the inner yoke is magnetically connected to the outer yoke, and the outer peripheral surfaces of the inner magnetized portions of the inner yoke are opposed to the inner peripheral surface of the rotor magnet, and the end of the rotary shaft of the rotor magnet is received in the hole formed on the end of the large diameter portion of the inner yoke, and there is provided the holding means for holding the rotor magnet at the position where the centers of the poles of the rotor magnet are deviated from the straight line connecting between the centers of the magnetized portions of the outer yoke and the rotation center of the rotor magnet. Thus, in the motor according to the present invention, the small diameter portion having a diameter smaller than the distance between the inner magnetized portions is formed in the inner yoke, and, only by reducing the diameter of the small diameter portion, the space within which the coil is wound can be windened so that the coil can be wound around the small diameter portion greatly, thereby providing a single-phase motor having high output.

Further, the diameter of the motor may be the extent that the magnetized portions of the outer yoke can be opposed to the diameter of the magnet, and the length of the motor may be a length obtained by adding the length of the coil to the length of the magnet. Thus, when the lengths of the magnet and the coil are minimized, a super-compact motor can be obtained. Further by providing the holding means, when the electricity is not supplied to the coil, the rotor magnet is stopped at the position where the centers of the magnetized portions of the rotor magnet are deviated from the straight line connecting between the centers of the outer magnetized portions and the rotational center of the magnet. From this position, when the electricity is supplied to the coil, the force of the outer yoke acting on the magnetized portions of the rotor magnet always directs toward the rotational direction of the rotor magnet, thereby starting the rotor magnet smoothly.

Further, since the small diameter portion of the inner yoke may have smallest volume that permits magnetic connection to the outer yoke, an adequate amount of coil can be wound around the small diameter portion of the inner yoke. Accordingly, the number of windings of the coil can be increased to increase a magnetomotive force (ampere-turn) upon energization of the coil, with the result that forces of the excited outer and inner magnetized portions acting on the magnetized portions of the rotor magnet are increased, thereby enhancing the rotational force (starting force) of the rotor magnet. Further, by increasing the distance between the opposed inner magnetized portions of the inner yoke within the inner diameter dimension of the rotor magnet as great as possible and by making the radial thickness of the cylindrical rotor magnet 1 very small, the gaps between the inner magnetized portions of the inner yoke and the opposed outer magnetized portions of the outer yoke can be made very small. As a result, the reluctance of the magnetic circuit constituted by the coil, inner yoke and outer yoke can be minimized, so that great magnetic flux is generated with smaller applied current, thereby improving the rotational force of the rotor magnet 1.

According to the present invention, second, in the motor, since D2<D2 is set when it is assumed that the inner diameter of the coil wound around the small diameter portion of the inner yoke is D1 and the diameter of the portion opposed to the inner peripheral surface of the rotor magnet is D2, the above-mentioned effects can be achieved more efficiently.

What is claimed is:

1. A motor comprising:
 a rotor magnet having a cylindrical shape at least an outer peripheral surface of which is alternately magnetized to different poles along a circumferential direction to define magnetic poles;
 a rotary shaft secured to said rotor magnet;
 a coil disposed in an axial direction of said rotor magnet and with said rotor magnet side by side;
 an outer yoke magnetized by said coil and having a first portion comprising outer magnetized portions opposed to the outer peripheral surface of said rotor magnet and a second portion, wherein said outer magnetized portions are constituted by notches and teeth extending in parallel with said rotary shaft, and said coil is mounted in said second portion of said outer yoke;
 an inner yoke magnetized by said coil and having a first portion comprising inner magnetized portions opposed to an inner peripheral surface of said rotor magnet and a second portion, wherein said inner magnetized portions are opposed to said outer magnetized portions, the diameter of said second portion of said inner yoke is smaller than the distance between said inner magnetized portions, and said coil is mounted on said second portion of said inner yoke, wherein magnetic flux generated by said coil traverses across said rotor magnet between said inner magnetized portions and said outer magnetized portions; and
 holding means for holding said rotor magnet at a position where centers of said magnetic poles of said rotor magnet deviate from a straight line connecting centers of said outer magnetized portions and a rotational center of said rotor magnet when said outer and inner magnetized portions are not magnetized by said coil.

2. A motor according to claim 1, wherein said outer and inner yokes define a stator, and said holding means includes positioning stators disposed between the teeth of sand outer magnetized portions of said stator.

3. A motor according to claim 2, wherein said outer magnetized portions of said outer yoke are secured to a cylindrical cover, and said rotary shaft secured to said rotor magnet extends through said cover.

4. A motor according to claim 3, wherein a bearing for one end of said rotary shaft is provided in said cover and a bearing for the other end of said rotary shaft is provided in said inner yoke.

5. A motor according to claim 1, wherein, when it is assumed that an inner diameter of said coil mounted on said second portion of said inner yoke is D1 and a distance between said inner magnetized portions of said inner yoke is D2, D1<D2.

6. A motor according to claim 1, wherein said magnet further includes another magnetized layer alternately magnetized to different poles along the circumferential direction, wherein the poles of said another magnetized layer are positioned to be out of phase with the poles of the outer peripheral surface of the rotor magnet, and wherein said holding means has extended sections extending from said outer magnetized portions and opposed to an outer peripheral surface of said another magnetized layer.

7. A motor comprising:
 a rotor magnet having a cylindrical shape, at least an outer peripheral surface of which is alternately magnetized to different poles along a circumferential direction to define magnetic poles;
 a rotary shaft secured to said rotor magnet;
 an outer yoke having outer magnetized portions opposed to the outer peripheral surface of said rotor magnet, wherein said outer magnetized portions are constituted by notches and teeth extending in parallel with said rotary shaft;
 an inner yoke having inner magnetized portions opposed to an inner peripheral surface of said rotor magnet, wherein said inner magnetized portions are opposed to said outer magnetized portions, said inner yoke having a small diameter portion for magnetic connection to said outer yoke, a diameter of said small diameter portion being smaller than a distance between said inner magnetized portions;
 a coil disposed mounted on said small diameter portion of said inner yoke and adapted to magnetize said outer and inner yokes, wherein magnetic flux generated by said coil traverses across said rotor magnet between said outer magnetized portions and said inner magnetized portions; and
 holding means for holding said rotor magnet at a position where centers of said magnetic poles of said rotor magnet deviate from a straight line connecting centers of said outer magnetized portions and a rotational center of said rotor magnet when sard outer and inner magnetized portions are not magnetized by said coil.

8. A motor comprising:
 a rotor magnet having a cylindrical shape, at least an outer peripheral surface of which is alternately magnetized to different poles along a circumferential direction to define magnetic poles;
 a rotary shaft secured to said rotor magnet;
 an outer yoke having outer magnetized portions opposed to the outer peripheral surface of said rotor magnet, wherein said outer magnetized portions are constituted by notches and teeth extending in parallel with said rotary shaft;

an inner yoke having inner magnetized portions opposed to an inner peripheral surface of said rotor magnet, wherein said inner magnetized portions are opposed to said outer magnetized portions, said inner yoke having a small diameter portion for magnetic connection to said outer yoke, a diameter of said small diameter portion being smaller than a distance between said inner magnetized portions;

a coil disposed mounted on said small diameter portion of said inner yoke and adapted to magnetize said outer and inner yokes, wherein magnetic flux generated by said coil traverses across said rotor magnet between said outer magnetized portions and said inner magnetized portions;

holding means for holding said rotor magnet at a position where centers of said magnetic poles of said rotor magnet deviate from a straight line connecting centers of said outer magnetized portions and a rotational center of said rotor magnet when said outer and inner magnetized portions are not magnetized by said coil; and a cylindrical cover within which said outer magnetized portions of said outer yoke are secured, said cover being provided with a bearing for one end of said rotary shaft secured to said rotor magnet, and wherein a bearing for the other end of said rotary shaft is formed in said inner yoke.

9. A motor according to claim 8, wherein said bearing for the other end of said rotary shaft formed in said inner yoke is located between a position where said coil is wound and a position corresponding to ends of said inner magnetized portions.

* * * * *

UNITED STATES PATENT AND TRADEMARK OFFICE
CERTIFICATE OF CORRECTION

PATENT NO.   : 6,316,851 B1
DATED        : November 13, 2001
INVENTOR(S)  : Hiroaki Maegawa et al.

It is certified that error appears in the above-identified patent and that said Letters Patent is hereby corrected as shown below:

Title page,
Item [56], References Cited, U.S. PATENT DOCUMENTS, "4,004,165" should read -- 4,004,168 --.

Column 1,
Line 32, "as" should read -- as can be --;
Line 35, "numerals" should read -- numeral --; and "denote" should read -- denotes --.

Column 2,
Line 45, "the" should read -- a --; and "a" ($1^{st}$ occurrence) should read -- the --.

Column 4,
Line 15, "nevertheless" should read -- although --;
Line 27, "in comparison with the face" should read -- in view of the fact --;
Line 60, "in" should read -- coaxially --;
Line 61, "coaxial" should be deleted.

Column 5,
Line 8, "poles as is" should read -- poles, as --;
Line 21, "excited by supplying electricity" should read -- are excited by supplying electricity to --;
Line 39, "is" should read -- is greater than D1, is --;
Lines 54 and 61, "notches" should read -- gaps --.

Column 6,
Line 9, "the" should read -- since the --;
Line 30, "a" should read -- to a --;
Line 66, "stator" should read -- stators --.

Column 7,
Line 40, "an" should read -- a --.

Column 8,
Line 18, "stator" should read -- stators --;
Line 30, "the few" should read -- a small --;
Line 64, "notches" should read -- gaps --.

Column 9,
Line 60, "increases" should read -- increased --.

UNITED STATES PATENT AND TRADEMARK OFFICE
CERTIFICATE OF CORRECTION

PATENT NO.     : 6,316,851 B1
DATED          : November 13, 2001
INVENTOR(S)    : Hiroaki Maegawa et al.

It is certified that error appears in the above-identified patent and that said Letters Patent is hereby corrected as shown below:

<u>Column 11,</u>
Line 23, "an" should read -- a --.

<u>Column 12,</u>
Line 50, "windened" should read -- widened --.

<u>Column 13,</u>
Line 27, "D2<D2" should read -- D1<D2 --;
Line 40, "magnet" should read -- magnet; --;
Line 41, "and with said rotor magnet side by side;" should be deleted;
Line 46, "notches" should read -- gaps --;
Line 47, "shaft," should read -- shaft, wherein the gaps are between the teeth --.

<u>Column 14,</u>
Line 3, "sand" should read -- said --;
Line 34, "notches" should read -- gaps --;
Line 35, "shaft;" should read -- shaft, wherein the gaps are between the teeth --;
Line 54, "sard" should read -- said --;
Line 56, "comprising:" should read -- according to claim 7, further comprising --;
Lines 57-67, should be deleted.

<u>Column 15,</u>
Lines 1-17, should be deleted.

<u>Column 16,</u>
Lines 1-4, should be deleted.

Signed and Sealed this

Twenty-ninth Day of October, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.    : 6,316,851 B1
DATED         : November 13, 2001
INVENTOR(S)   : Hiroaki Maegawa et al.

It is certified that error appears in the above-identified patent and that said Letters Patent is hereby corrected as shown below:

<u>Title page,</u>
Item [75], Inventors: "Chikara Aoshima, Zami" should read -- Chikara Aoshima, Zama --.

Signed and Sealed this

First Day of April, 2003

JAMES E. ROGAN
*Director of the United States Patent and Trademark Office*